No. 646,942. Patented Apr. 10, 1900.
S. R. BAILEY.
FOOT REST FOR CARRIAGES.
(Application filed Feb. 27, 1900.)
(No Model.)
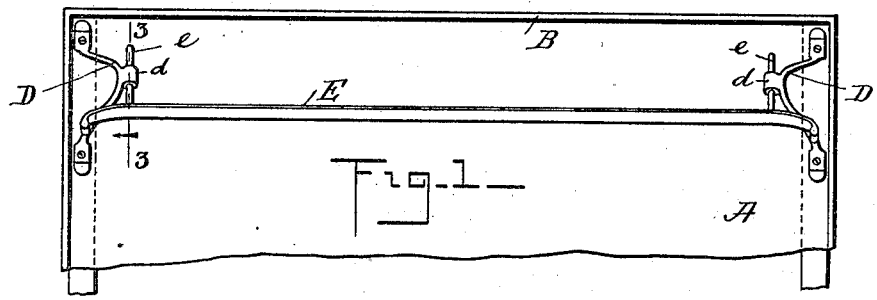
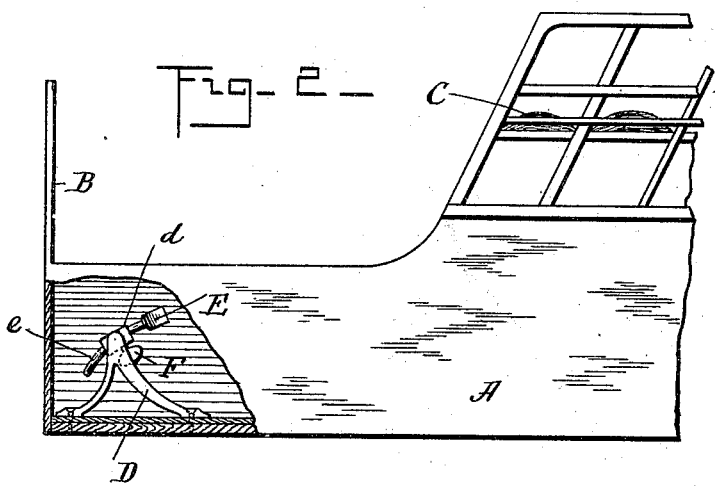
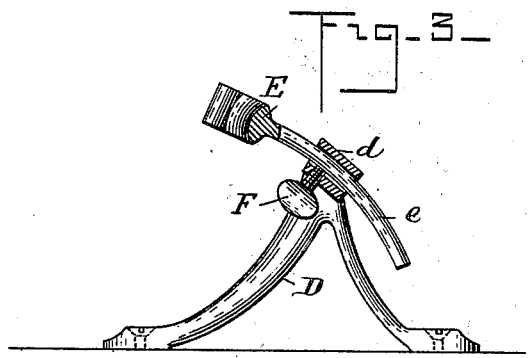
Witnesses
Charles F Logan.
B. E. Brewster.
Inventor
Samuel R. Bailey
by Alban Andrieu
his atty.

United States Patent Office.

SAMUEL R. BAILEY, OF AMESBURY, MASSACHUSETTS.

FOOT-REST FOR CARRIAGES.

SPECIFICATION forming part of Letters Patent No. 646,942, dated April 10, 1900.

Application filed February 27, 1900. Serial No. 6,732. (No model.)

*To all whom it may concern:*

Be it known that I, SAMUEL R. BAILEY, a citizen of the United States, residing at No. 188 Main street, Amesbury, in the county of Essex and State of Massachusetts, have invented new and useful Improvements in Foot-Rests for Carriages or other Vehicles, of which the following is a specification.

This invention relates to improvements in adjustable foot-rests for carriages or other vehicles; and it has for its object to readily adjust the position of the foot-rest relative to the seat and the length of the lower limbs of the driver or occupant of the vehicle, so as to produce a proper and comfortable foot-support, as will hereinafter be more fully shown and described, reference being had to the accompanying drawings, wherein—

Figure 1 represents a top plan view of the improved adjustable foot-rest shown as applied to the forward portion of a carriage-body. Fig. 2 represents a side elevation of the invention shown as applied to a carriage-body, parts of the latter being shown in section; and Fig. 3 represents an enlarged section on the line 3 3 shown in Fig. 1.

Similar letters refer to similar parts wherever they occur on the different parts of the drawings.

In Figs. 1 and 2, A represents the body of a carriage, on which B is the dasher and C the seat, as usual.

To the carriage-body are secured a pair of metal brackets or supports D D, each one having at or near its upper end a perforated hub guide or socket $d$, as shown in the drawings.

E represents the adjustable foot-rest bar, provided with preferably slightly-curved transverse shanks or rods $e\ e$, received or guided in the sockets $d\ d$ and adjustably secured therein, preferably by means of thumb or set screws F F, as shown. The foot-rest bar E may readily be adjusted to and from the seat C simply by loosening the binder-screws F F, after which the bar E may be moved forward or backward, while its shanks or rods $e\ e$ are adjusted in the perforated sockets or guides $d\ d$, and after the bar E has been adjusted in its position relative to the seat C it is firmly secured in such adjusted position simply by tightening the set-screws or thumb-screws F F, as shown, causing the foot-rest bar to be held and secured firmly in its adjusted position. By making the shanks or rods $e\ e$ slightly curved, as shown, the foot-rest bar E may readily be adjusted to and from the rider or occupant of the carriage without unduly raising the said foot-rest bar. By this simple construction a foot-rest can readily be adjusted, according to the length of the limbs of the person occupying the front seat of a carriage, thus providing a convenient and proper foot-support.

The invention is very simple in construction and is composed of very few parts by means of which the foot-rest can be readily adjusted, as hereinabove described.

What I wish to secure by Letters Patent and claim is—

The herein-described adjustable foot-rest for vehicles, consisting of brackets or supports D, D, secured to the carriage-body and having each a perforated socket or guide $d$, combined with a foot-rest bar E, having shanks or rods $e, e$, adjustably arranged within the said sockets or guides $d, d$, and a set-screw or equivalent device for securing the said shanks or rods in their adjusted proper position within said sockets or guides, substantially as and for the purpose set forth.

In testimony whereof I have hereunto set my hand in presence of two subscribing witnesses.

SAMUEL R. BAILEY.

Witnesses:
ALBAN ANDRÉN,
LAURITZ N. MÖLLER.